(12) United States Patent
Yamakawa et al.

(10) Patent No.: US 9,853,305 B2
(45) Date of Patent: Dec. 26, 2017

(54) COMPOSITE MEMBRANE AND MOISTURE ADJUSTMENT MODULE USING SAME

(71) Applicants: W. L. Gore & Associates, Inc., Newark, DE (US); W. L. Gore & Associates, Co., Ltd., Tokyo (JP)

(72) Inventors: Keiichi Yamakawa, Tokyo (JP); William B. Johnson, Newark, DE (US); Mahesh Murthy, Newark, DE (US); Thomas Berta, Wilmlington, DE (US)

(73) Assignees: W. L. Gore & Associates, Inc., Newark, DE (US); W. L. Gore & Associates, Co., Ltd., Tokyo (JP)

( * ) Notice: Subject to any disclaimer, the term of this patent is extended or adjusted under 35 U.S.C. 154(b) by 36 days.

(21) Appl. No.: 14/663,645

(22) Filed: Mar. 20, 2015

(65) Prior Publication Data
US 2015/0311546 A1 Oct. 29, 2015

Related U.S. Application Data

(62) Division of application No. 12/239,037, filed on Sep. 26, 2008, now abandoned.

(30) Foreign Application Priority Data

Jun. 25, 2008 (JP) ................... 2008-166389

(51) Int. Cl.
*H01M 8/04* (2016.01)
*H01M 8/04119* (2016.01)
(Continued)

(52) U.S. Cl.
CPC ...... *H01M 8/04149* (2013.01); *B01D 63/082* (2013.01); *B01D 67/0013* (2013.01);
(Continued)

(58) Field of Classification Search
CPC ........... B32B 5/18; B32B 37/02; B32B 38/00; B01D 63/082; B01D 69/10; B01D 69/12;
(Continued)

(56) References Cited

U.S. PATENT DOCUMENTS 6,800 A * 10/1849 Kusunose ................. E05B 3/06
292/348
4,051,898 A 10/1977 Yoshino et al.
(Continued)

FOREIGN PATENT DOCUMENTS

EA 0012491 A1 9/1979
EA 0661 502 A2 9/1994
(Continued)

OTHER PUBLICATIONS

2008166389,Decision_to_Grant_a_Patent JPONov. 13, 2012.*
(Continued)

*Primary Examiner* — Alex Usyatinsky
(74) *Attorney, Agent, or Firm* — Kilpatrick Townsend & Stockton, LLP

(57) ABSTRACT

A composite membrane and moisture adjustment module using the same is disclosed. The composite membrane includes a moisture-permeable resin layer interposed between porous membranes that constitute a pair; and the mean thickness of the moisture-permeable resin layer is 5 μm or less.

19 Claims, 2 Drawing Sheets

(51) Int. Cl.
| | |
|---|---|
| B01D 63/08 | (2006.01) |
| B01D 67/00 | (2006.01) |
| B01D 69/10 | (2006.01) |
| B01D 69/12 | (2006.01) |
| B01D 71/32 | (2006.01) |
| B01D 71/38 | (2006.01) |
| H01M 8/1023 | (2016.01) |
| H01M 8/1039 | (2016.01) |
| H01M 8/1053 | (2016.01) |
| H01M 8/106 | (2016.01) |
| H01M 8/1062 | (2016.01) |
| H01M 8/1067 | (2016.01) |
| H01M 8/1081 | (2016.01) |
| H01M 8/1018 | (2016.01) |

(52) U.S. Cl.
CPC .............. *B01D 69/10* (2013.01); *B01D 69/12* (2013.01); *B01D 71/32* (2013.01); *B01D 71/38* (2013.01); *H01M 8/106* (2013.01); *H01M 8/1018* (2013.01); *H01M 8/1023* (2013.01); *H01M 8/1039* (2013.01); *H01M 8/1053* (2013.01); *H01M 8/1062* (2013.01); *H01M 8/1067* (2013.01); *H01M 8/1081* (2013.01); *B01D 2313/14* (2013.01); *B01D 2319/06* (2013.01); *B01D 2323/08* (2013.01); *B01D 2323/30* (2013.01); *B01D 2325/02* (2013.01); *B01D 2325/04* (2013.01); *B01D 2325/20* (2013.01); *B01D 2325/36* (2013.01); *B01D 2325/38* (2013.01); *B01D 2325/42* (2013.01); *H01M 2008/1095* (2013.01); *H01M 2300/0082* (2013.01); *Y02P 70/56* (2015.11); *Y10T 156/10* (2015.01); *Y10T 428/24998* (2015.04); *Y10T 428/249991* (2015.04)

(58) Field of Classification Search
CPC ... B01D 71/32; B01D 71/38; H01M 8/04149; H01M 8/1023; H01M 8/1039; H01M 8/1053; H01M 8/106; H01M 8/1062; H01M 8/1067; H01M 8/1081; H01M 8/1018
See application file for complete search history.

(56) References Cited

U.S. PATENT DOCUMENTS

| | | | |
|---|---|---|---|
| 4,612,019 A | 9/1986 | Langhorst | |
| 4,840,819 A | 6/1989 | Williams et al. | |
| 4,871,461 A | 10/1989 | Karakane et al. | |
| 4,909,810 A | 3/1990 | Nakao et al. | |
| 5,418,054 A | 5/1995 | Sun | |
| 5,445,739 A | 8/1995 | Fujimoto et al. | |
| 5,804,011 A * | 9/1998 | Dutta | A41D 31/02 156/160 |
| 6,074,738 A | 6/2000 | von Fragstein et al. | |
| 6,635,104 B2 | 10/2003 | Komkova et al. | |
| 6,800,118 B2 | 10/2004 | Kusunose et al. | |
| 7,572,321 B2 * | 8/2009 | Yamakawa | B01D 67/0009 165/60 |
| 2005/0235826 A1 | 10/2005 | Jensvold et al. | |
| 2005/0266754 A1 | 12/2005 | Wyner et al. | |
| 2006/0090650 A1 * | 5/2006 | Yamakawa | B01D 67/0009 96/11 |
| 2007/0087245 A1 * | 4/2007 | Fuller | H01M 4/926 429/454 |
| 2007/0264538 A1 | 11/2007 | Schank et al. | |

FOREIGN PATENT DOCUMENTS

| | | |
|---|---|---|
| JP | 56-30595 | 3/1981 |
| JP | S57-207795 A | 12/1982 |
| JP | S57207795 * | 12/1982 |
| JP | H1-199625 A | 8/1989 |
| JP | H01199625 * | 8/1989 |
| JP | 2003-287387 * | 10/2003 |
| JP | 2003-287387 A | 10/2003 |
| JP | 2006-160966 | 6/2006 |
| WO | WO2007/117230 | 10/2007 |
| WO | WO-2009/158030 A1 | 12/2009 |

OTHER PUBLICATIONS

20117001741Decision_to_Grant_a_Patent KIPO Dec. 5, 2016.*
Fukazawa, T., Kawamura, H. & Tamura, T. 1999, "Water Vapor Resistance of Hydrophobic Microporous Membranes Under reduced Pressure at Constant Temperature", Journal of Textile Institute, vol. 90, No. 4, pp. 602-615.
Gibson, P. W. 2000, "Effect of temperature on water vapor transport through polymer membrane laminates", Polymer Testing, vol. 19, No. 6, pp. 673-691.
Huang, J. 2007, "A new test method for determining water vapor transport properties of polymer membranes", Polymer Testing vol. 26, No. 5, pp. 685-691.
Huizing, R. 2007, Design and Membrane selection for Gas to Gas Humidifiers for Fuel Cell Applications, Master of Applied Science in Chemical Engineering, University of Waterloo.

* cited by examiner

COMPOSITE MEMBRANE AND MOISTURE ADJUSTMENT MODULE USING SAME

BACKGROUND OF THE INVENTION

Conventionally, an olefin-based hollow filament or a hollow filament obtained using an ion-exchange fluororesin is used to humidify the gas fed to a fuel electrode or an air electrode of a fuel cell. However, hollow filaments have high ventilation resistance and make it difficult to raise the flow rate. Therefore, a membrane-type moistening module using a vapor-permeable membrane shows promise.

A composite membrane 10 having a moisture-permeable resin layer 30 on both surfaces of a porous polymeric resin article 20 is disclosed, for example, in Patent Document 1 as a vapor-permeable membrane, as shown in FIG. 1. However, in many cases, the composite membrane 10 cannot exhibit sufficient moisture permeability with one membrane. Therefore, as shown in FIG. 2, a plurality of composite membranes 10 is superposed while open spaces are left that can serve as gas channels. Also, spacers 50 are inserted between the composite membranes 10 in order to form the open spaces. When the moisture-permeable resin layers 30 are exposed on the surface of the composite membranes 10, the moisture-permeable resin layers 30 are damaged by the spacers 50. Furthermore, when exposed to hot water over a long period of time, the moisture-permeable resin layers 30 have inadequate durability. The adhesive strength between the composite membranes 10 and the spacers 50 is also low.

Patent Document 2 discloses a composite membrane 10 in which, in a layered object composed of a porous membrane 20 and a reinforcing element (nonwoven fabric or the like) 40, a moisture-permeable resin layer 30 is interposed between the reinforcing element 40 and the porous membrane 20 along the border that faces the membrane, as shown in FIG. 3. The risk that the moisture-permeable resin layer 30 will be damaged by the spacer 50 decreases since the moisture-permeable resin layer 30 is protected with the reinforcing element 40 and the porous membrane 20. Patent Document 3 will be described below.

[Patent Document 1] Japanese Laid-Open Patent Publication No. 2006-160966.
[Patent Document 2] Japanese Laid-Open Patent Publication No. 2006-150323.
[Patent Document 3] U.S. Pat. No. 5,418,054.

However, according to a study conducted by the inventors, bringing both the gas barrier properties and moisture permeability to a higher level was difficult to achieve in the composite membrane (vapor-permeable membrane) 10 disclosed in Patent Document 2. For example, in the composite membrane 10 disclosed in Patent Document 2, the moisture permeability deteriorates when the gas barrier properties are raised, and the gas barrier properties deteriorate when the moisture permeability is raised.

The present invention relates to a composite membrane capable of selectively transmitting water included in gas and liquid; preferably relates to a composite membrane that can be used as a dehumidification membrane, moistening membrane, pervaporation membrane (for example, a membrane for separating water and other liquids (such ethanol and other alcohols)); and more preferably relates to a composite membrane that can be used as a separation membrane to selectively transmit water vapor from a hot and humid gas (for example, a moistening membrane for using the water vapor included in the effluent gas (especially effluent gas on the side of an air electrode) of a fuel cell electrode in the humidification of the gas fed to a fuel electrode or the air electrode (especially the fuel electrode)).

However, according to a study conducted by the inventors, bringing both the gas barrier properties and moisture permeability to a higher level was difficult to achieve in the composite membrane (vapor-permeable membrane) 10 disclosed in Patent Document 2. For example, in the composite membrane 10 disclosed in Patent Document 2, the moisture permeability deteriorates when the gas barrier properties are raised, and the gas barrier properties deteriorate when the moisture permeability is raised.

The present invention was developed with a focus on circumstances such as those described above, and an object thereof is to provide a composite membrane 10 in which the balance between the gas barrier properties and moisture permeability is further improved; and to provide a moisture adjustment module using the composite membrane 10.

Another object of the present invention is to provide a composite membrane 10 further having excellent scratch resistance when brought into contact with a spacer or another external object 50; and to provide a moisture adjustment module using the composite membrane.

Yet another object of the present invention is to provide a composite membrane 10 further having excellent adhesive properties in relation to an extern object (spacer) 50; and to provide a moisture adjustment module using the composite membrane.

Yet another object of the present invention is to provide a less expensive composite membrane 10 that provides very high moisture vapor transport rates, very low air permeability and excellent long-term durability while simultaneously utilizing reduced quantities of a relatively expensive fluoropolymer resin; and a moisture adjustment module using the composite membrane.

The present invention was developed with a focus on circumstances such as those described above, and an object thereof is to provide a composite membrane 10 in which the balance between the gas barrier properties and moisture permeability is further improved; and to provide a moisture adjustment module using the composite membrane 10.

Another object of the present invention is to provide a composite membrane 10 further having excellent scratch resistance when brought into contact with a spacer or another external object 50; and to provide a moisture adjustment module using the composite membrane.

Yet another object of the present invention is to provide a composite membrane 10 further having excellent adhesive properties in relation to an external object (spacer) 50; and to provide a moisture adjustment module using the composite membrane.

Yet another object of the present invention is to provide a less expensive composite membrane 10 that provides very high moisture vapor transport rates, very low air permeability and excellent long-term durability while simultaneously utilizing reduced quantities of a relatively expensive fluoropolymer resin; and a moisture adjustment module using the composite membrane.

SUMMARY OF THE INVENTION

First embodiments of the invention include a composite membrane wherein a moisture-permeable resin layer is interposed between porous membranes that constitute a pair; and the mean thickness of the moisture-permeable resin layer is 5 μm μm or less. The moisture permeable resin can comprise a water-resistance, moisture permeable resin such that its degree of swelling is 20 times or less. It may also comprise a cross-linked polyvinyl alcohol, or an ion exchange fluororesin, or a perfluorosulfonic acid polymer. Additionally, the moisture-permeable resin layer may, at least in part, be embedded in one or both of the porous membranes. The porous membranes of these embodiments may have a mean pore diameter of 0.05 μm or greater; and the maximum pore diameter of 15 μm or less. Furthermore, the void content, of the porous membranes may be 40% or greater, and their mean thickness may be between 1 and 200 μm. Additionally, the composite membrane may have at least one of the porous membranes comprised of an expanded polytetrafluoroethylene membrane.

More embodiments of the instant invention include a composite membrane wherein an air-impermeable layer comprising an ionomeric polymer is interposed between a first and second micro-porous membrane. Further, the air-impermeable layer may comprise a perfluorosulfonic acid polymer. In these embodiments, at least one of the first or second micro-porous membranes may be hydrophobic or hydrophilic. The mean thickness of the air-impermeable layer may be less than 20 um, or less than 6 um. Further, at least part of the impermeable layer may be embedded in the micro-porous membrane, and at least one of the first and second micro-porous layers may comprise expanded polytetrafluoroethylene. Additionally, the air-impermeable layer may be reinforced, for example with particulates, a microporous membrane, or with expanded polytetrafluoroethylene.

In further embodiments, any of the composite membranes described above may have a gas-permeable reinforcing element layered on at least one of the porous membranes. The gas-permeable reinforcing element may be a woven or a non-woven material comprising a polymer, metal, or ceramic material.

In yet further embodiments, any of the composite membranes described above may be used in a moisture adjustment module obtained by superposing any of the composite membranes described herein while open spaces are left therebetween.

More embodiments of the invention include methods of preparing a composite membrane comprising the steps of (a) casting a solution comprising a moisture permselective resin on a first micro-porous membrane to form a film on the surface of the micro-porous membrane; (b) stretching a second micro-porous membrane over the film before it is dry to form a composite structure; and (c) drying the composite structure to remove residual liquid the solution. The method may also be performed so that the film is between 0.5 and 10 um thick after step c. Additionally, an additional step of heat-treating the composite membrane after step (c) may be performed, and the heat treatment may comprise holding the composite membrane at a temperature between 100 and 180 C for a period of time between 1 and 15 minutes. Further embodiments of the method include laminating a reinforcing member to at least one side of the composite membrane after step c. The reinforcing member is gas permeable, and may comprise a woven or non-woven material comprising metal, ceramic or polymer.

Yet more embodiments include a method of preparing a composite membrane comprising the steps of: (a) preparing a membrane having two sides, the membrane comprising a moisture perms elective resin; (b) laminating one side of the membrane to a first micro-porous membrane; and (c) laminating a second micro-porous membrane to the second side of the membrane. As used herein, lamination may include any combination of heat and/or pressure required to bond two materials together. The first micro-porous membrane and the second micro-porous membrane may comprise expanded polytetrafluoroethylene, or the membrane comprising the moisture permselective resin may further comprises expanded polytetrafluoroethylene, or a perfluorosulfonic acid polymer. Additionally, a reinforcing member may be laminated to at least one side of the composite membrane after step c. Further, the membrane comprising the moisture permselective resin in step (a) may have a mean thickness of less than 15 μm, or less than 6 μm.

KEY

Figure 1:
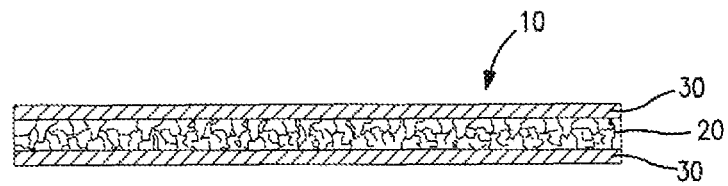
FIG. 1 is a schematic cross-sectional view showing an example of a conventional composite membrane.

10: composite membrane
20: porous membranes
30: moisture-permeable resin layer
30: reinforced moisture-permeable resin layer
30: moisture-permeable resin
30: thin porous membrane
40: gas-permeable reinforcing element

DETAILED DESCRIPTION OF THE INVENTION

Figure 4:
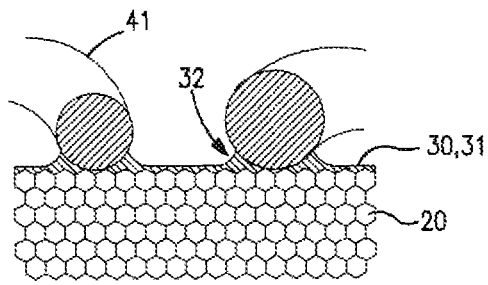
FIG. 4 is an expanded schematic cross-sectional view of an area of the composite membrane in FIG. 3.

Upon repeated intense study aimed at solving the above-described problems, the inventors of the present invention discovered that the thickness of a moisture-permeable resin layer 30 becomes non-uniform in cases in which the moisture-permeable resin layer 30 is formed between a reinforcing element (nonwoven fabric) 40 and a porous membrane 20 in the manner described with reference to Patent Document 2. FIG. 4 is a schematic cross-sectional view showing in enlarged and schematic form areas in which the nonwoven fabric 40 and the porous membrane 20 are joined to each other. As shown in the drawing, the fiber 41 constituting the nonwoven fabric 40 is extremely large in comparison with the surface unevenness (pore diameter) of the porous membrane 20. Generally, the moisture-permeable resin layer 30 is formed by solidifying a liquid moisture-permeable resin 31. In cases in which the reinforcing element (nonwoven fabric) 40 and the porous membrane 20 are layered together, a liquid pool 32 containing the liquid moisture-permeable resin is formed at the border of the fiber 41 of the nonwoven fabric and the porous membrane 20, and the thickness of the moisture-permeable resin layer 30 becomes non-uniform. When the thickness of the moisture-permeable resin layer 30 becomes non-uniform, the entire moisture-permeable resin layer 30 must be formed thickly in order to prevent pinholes from forming in the thin regions and to secure the desired gas barrier properties, and the moisture permeability is adversely affected.

Figure 5:
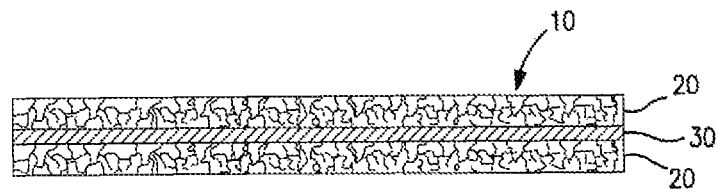
FIG. 5 is a schematic cross-sectional view showing an example of the composite membrane of the present invention.
Figure 6:
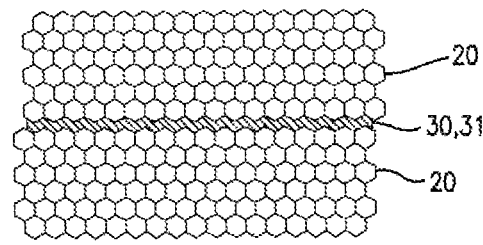
FIG. 6 is an expanded schematic cross-sectional view of an area of the composite membrane in FIG. 5.

In contrast to this, as shown in FIG. 5, the present inventors discovered that the moisture-permeable resin layer 30 could be formed thinly and uniformly in cases in which the moisture-permeable resin layer 30 is formed between two porous membranes 20 that constitute a pair. FIG. 6 is a schematic cross-sectional view showing in enlarged and schematic form a joint between the two porous membranes 20 that constitute a pair. As shown in the diagram, the surface of the porous membranes 20 is much smoother than that of the nonwoven fabric 40. Therefore, liquid pools of the liquid moisture-permeable resin 31 do not form easily and the moisture-permeable resin layer 30 can be formed uniformly. If the moisture-permeable resin layer 30 can be formed uniformly, then the moisture-permeable resin layer 30 can be formed thinly without producing pinholes, and better moisture permeability can be obtained without any degradation of the gas barrier properties. Therefore, it was discovered that the balance between the gas barrier properties and moisture permeability could be further improved by forming the moisture-permeable resin layer 30 between the porous membranes 20 that constitute a pair, and the present invention was perfected.

Patent Document 3 (U.S. Pat. No. 5,418,054) discloses a flame-resistant laminate which is waterproof, has moisture permeability, and includes a first layer of a porous expanded polytetrafluoroethylene membrane, a second layer of a porous expanded polytetrafluoroethylene membrane, and a phosphorus-containing poly(urea/urethane) adhesive layer for bonding the first and second layers together. However, this laminate laminate is used for protective clothing, and the phosphorus-containing poly(urea/urethane) adhesive layer is not very thin. Rather, when the adhesive layer is made thinner, the adhesive strength between the layers is reduced by a reduction in the amount in which the phosphorus-containing poly(urea/urethane) adhesive is impregnated into the structure of the porous drawn polytetrafluoroethylene membrane, the layers become detached easily when washed or subjected to intense movements of the human body, and the target function cannot be obtained. This is due to the fact that the phosphorus-containing poly(urea/urethane) adhesive and the porous drawn polytetrafluoroethylene membranes are bonded to each other not by chemical bonding but by electrostatic adhesion or the embedding of the adhesive in the porous structure (anchoring effect). Also, the document does not mention the pore diameter of the drawn polytetrafluoroethylene membranes. Normally, the pore diameter of an expanded polytetrafluoroethylene membrane is small in protective clothing. Finally, the use of a polymer that is not cross-linked, i.e., a non-thermosetting polymer, is not disclosed. For example, the use of a fluororesin layer, for example a layer of perfluorosulfonic acid polymer, or any ionomeric polymer between the ePTFE layers was not described. This is an important distinction because the art to date has demonstrated only the use of cross-linked polymers because it has been thought that only such polymers could provide the durability required in applications where high moisture transport rates were required. The composite materials of this invention overcome that limitation by protecting the moisture transport layer with a porous or microporous layer on both sides the moisture transport layer. This significantly widens the choice of moisture-permeable resin layers allowing the use of ionomeric polymers and other non-cross linked polymers.

Accordingly, the composite membrane according to present invention has a moisture-permeable resin layer 30 sandwiched between two porous membranes 20 that constitute a pair, and the mean thickness of the moisture-permeable resin layer 30 is 5 µm or less. The moisture-permeable resin is preferably a water-resistant, moisture-permeable resin. The degree of swelling of the water-resistant, moisture-permeable resin, as calculated based on the change in the volume of the resin before and after the water resistance test described below, is 20 times or less.

Degree of swelling=Volume of resin after water resistance test/Volume of resin before water resistance test Water resistance test; The resin is allowed to stand for 24 hours in an environment having a temperature of 120° C. and a water vapor pressure of 0.23 MPa, and is subsequently immersed for 15 minutes in water having a temperature of 25° C.

The water-resistant, moisture-permeable resin may, for example, be a crosslinked polyvinyl alcohol, an ion-exchange fluororesin, or an ionomeric polymer, or the like. As used herein, an ionomer polymer is an ion-containing copolymer in which up to 15 mol % of the repeat units contain ionic groups. At least part of the moisture-permeable resin may be embedded in the porous membrane.

The porous membrane (expanded polytetrafluoroethylene membrane or the like) has, for example, a mean pore diameter of 0.05 µm or greater, a maximum pore diameter of 15 µm or less, a void content of 40% or greater, and a mean thickness of 1 to 200 µm. A gas-permeable reinforcing element may be layered on at least one of the porous membranes. The present invention includes a moisture adjustment module obtained by superposing the composite membranes while open spaces are left therebetween.

Both the moisture permeability and gas barrier properties of the composite membrane 10 according to the present invention can be brought to a higher level because the moisture-permeable resin layer 30 is formed uniformly and thinly. Furthermore, the moisture-permeable resin layer 30 is protected with a porous membrane, and therefore has excellent surface durability when brought into contact with an external object 50. Furthermore, since the porous membranes 20 are exposed on the surface, the adhesive penetrates into the porous membranes 20 and exhibits an anchoring effect when an external object (especially a spacer) 50 or the like is attached, and the joint strength can be increased.

When a water resistant, moisture-permeable resin is used in the composite membrane 10 of the present invention, durability in humid and moist conditions (resistance characteristics in a hot and humid environment) can be improved, and moisture permeability in a hot and humid environment is improved as well.

(i) Composite Membrane

The structure of the composite membrane of the present invention will be described in detail below with reference to an illustrated example.

FIG. 5 is schematic cross-sectional view showing an example of the composite membrane 10 of the present invention. In the composite membrane 10 of the present invention, a moisture-permeable resin layer 30 is sandwiched between two porous membranes 20 that constitute a pair, as shown in FIG. 5. Therefore, the moisture-permeable resin layer 30 is protected by the porous membranes 20 and has excellent surface durability when brought into contact with an external object 50. Furthermore, since the porous membranes 20 are exposed on the surface, the adhesive penetrates into the porous membranes 20 and exhibits an anchoring effect when an external object (especially a spacer) 50 or the like is attached, making it possible to increase the joint strength. Moreover, in cases in which the moisture-permeable resin layer 30 is sandwiched between the two porous membranes 20 that constitute a pair, the moisture-permeable resin layer 30 can be made thinner without producing pinholes, unlike in the case of Patent Document 2. Both the moisture permeability and gas barrier properties can be brought to a higher level by reducing the the thickness of the moisture-permeable resin layer 30.

The composite membrane 10 can be produced, for example, by coating a surface of one of the porous membranes 20 with a liquid that includes a moisture-permeable resin and removing the solvent from the applied liquid after the coated surface is covered with the other porous membrane 20. The moisture-permeable resin layer 30 may be formed on that surface without being embedded in the porous membranes 20. However, normally at least part of the moisture-permeable resin layer 30 is embedded in the porous membranes 20. Durability is improved when the moisture-permeable resin layer 30 is embedded in the porous membranes 20.

Figure 7:
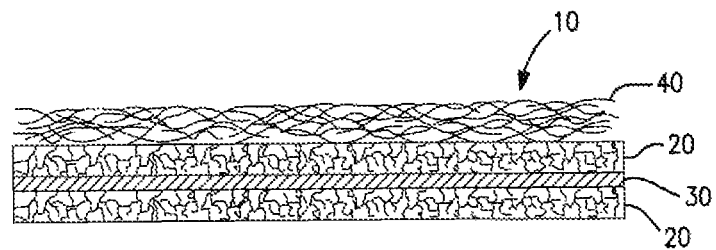
FIG. 7 is a schematic cross-sectional view showing another example of the composite membrane of the present invention.

In the composite membrane 10, a gas-permeable reinforcing element 40 may be layered (bonded) to one of the porous membranes 20, as shown in FIG. 7. The composite membrane 10 can be made stronger by the layering of the gas-permeable reinforcing element 40. The gas-permeable reinforcing element 40 may be layered on both of the porous membranes 20.

The gas-permeable reinforcing element 40 may, for example, be bonded to the porous membranes 20 by heat fusion or the like.

Each of the membranes and layers is described in detail below.

(ii) Moisture-Permeable Resin Layer 30

The mean thickness of moisture-permeable resin layer 30 is 5 μm or less, preferably 3 μm or less, and even more preferably 2 μm or less. The balance between gas barrier properties and air permeability can be improved by reducing the mean thickness. It is preferable for the mean thickness to be as small as possible so long as pinholes do not occur, and the lowest limit allowed may, for example, be 0.1 μm or greater (particularly, 0.2 μm or greater).

The mean thickness t of the moisture-permeable resin layer 30 can be calculated according to the following formula by observing a section of the composite membrane 10 with a scanning electron microscope to determine the surface area A of the moisture-permeable resin layer 30 and the length L of the moisture-permeable resin layer 30.

Mean thickness t=Surface area $A$/Length $L$

The preferred moisture-permeable resin is a water resistant, moisture-permeable resin having high water resistance. The high water resistance allows durability (resistance to high temperature and humidity) to be improved during service in a hot and humid environment. In addition, moisture permeability in a hot and humid environment is improved as well.

The water resistance of the water resistant moisture-permeable resin can be evaluated based on the degree of swelling determined using the water resistance test described below. The degree of swelling of the water resistant moisture-permeable resin is, for example, 20 times or less, preferably 15 times or less, and even more preferably ten times or less. The lower limit of the degree of swelling is not particularly limited and may be two times or greater (particularly five times or greater).

Water resistance test: The resin is allowed to stand for 24 hours in an environment having a temperature of 120° C. and a water vapor pressure of 0.23 MPa, and is subsequently immersed for 15 minutes in water having a temperature of 25° C. The change in the volume of the resin is measured before and after the test, and the degree of swelling is calculated based on the following formula.

Degree of swelling=Volume of resin after water resistance test/Volume of resin before water resistance test Specific examples of the moisture-permeable resin include resins (protic hydrophilic resins) having hydrophilic protic groups in the repeating units thereof, such as polystyrene sulfonic acid, polyvinyl alcohol, vinyl alcohol copolymers (ethylene/vinyl alcohol copolymers, tetrafluoroethylene/vinyl alcohol copolymers), ion-exchange fluororesins ("Nation®" manufactured by DuPont, "Flemion®" manufactured by Asahi Glass Co., inc., and the like), divinyl benzene/sulphonic acid copolymers, divinyl benzene/carboxylic acid copolymers, and other an ion-exchange resins; and resins (aprotic hydrophilic resins) having aprotic hydrophilic groups in the repeating units thereof, such as polyethylene oxide, polyvinyl pyridine, polyvinyl ether, polyvinyl pyrrolidone, and pyrrolidone.

Furthermore, the moisture-permeable resin may be formed as a three dimensional crosslinked structure. Examples of a three-dimensional crosslinked moisture-permeable resin include crosslinked protonic hydrophilic resin, crosslinked aprotic hydrophilic resins, silicone resins, and the like. A three-dimensional crosslinked moisture-permeable resin has excellent water resistance.

The moisture-permeable resin (including the three-dimensional crosslinked moisture-permeable resin) can be used individually or as a combination of two or more resins. A preferred moisture-permeable resin is a crosslinked polyvinyl alcohol (for example, a crosslinked structure based on a mixture of HCl and glutaraldehyde, a crosslinked structure based on formaldehyde, a crosslinked structure based on a blocked isocyanate, or the like) or an ion-exchange fluororesin. A crosslinked polyvinyl alcohol not only has excellent water resistance, but can also be applied readily and can easily produce a thinner moisture-permeable resin layer 30. Since an ion-exchange fluororesin has excellent heat resistance and chemical resistance, durability is high in a hot and humid environment or a system in which an acid, alkali, or the like is present, and the resin is suitable for use in a severe environment.

The moisture-permeable resin layer 30 may also include a humectant. A humectant-containing moisture-permeable resin layer 30 can retain more moisture, and the moisture permeability can be further increased. A water-soluble salt can be used as the humectant. Specifically, a lithium salt, phosphate, or the like can be used.

Figure 8A:
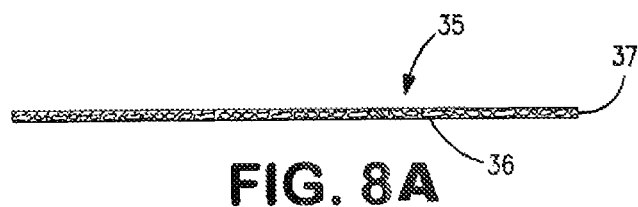
FIG. 8A is a schematic cross-sectional view of a moisture-permeable resin layer according to an embodiment of this disclosure.
Figure 8B:
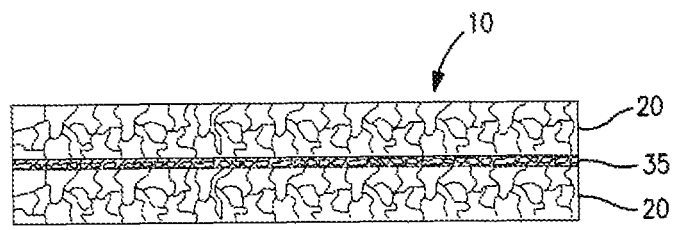
FIG. 8B is a schematic cross-sectional view of a composite membrane according to an embodiment of this disclosure

The moisture-permeable resin layer 30 may be reinforced with a thin porous membrane as long as a predetermined mean thickness can be maintained. An example of a composite membrane provided with such a moisture-permeable resin layer is shown in FIG. 8A. FIG. 8A is a schematic cross-sectional view of a moisture-permeable resin layer 35 reinforced with a thin porous membrane 37, and FIG. 8B is a schematic cross-sectional view of a composite membrane 10 provided with the moisture-permeable resin layer 35. The composite membrane 10 in FIG. 8A can be produced by impregnating the entire thin porous membranes 37 with a liquid that includes the moisture-permeable resin 36, then covering both sides of the thin porous membrane 37 with the porous membranes 20, and subsequently removing the solvent.

A membrane similar to the below-described porous membranes 20 can be used as the thin porous membranes 37 within a range in which the mean thickness of the moisture-permeable resin layer 35 can be maintained.

(iii) Porous Membranes 20

As mentioned above, in the present invention, the moisture-permeable resin layer layer 30 is made uniformly thinner by being sandwiched between two porous membranes 20 that constitute a pair. The surface unevenness (pore diameter) of the porous membranes 20 is much smaller in comparison with the fiber diameter of a nonwoven fabric, preventing the liquid moisture-permeable resin from pooling. Therefore a moisture-permeable resin layer can be formed uniformly and thinly.

The maximum pore diameter of the porous membranes 20 is, for example, 15 μm or less, preferably 5 μm or less, and more preferably 0.5 μm or less. Making the moisture-permeable resin layer uniform becomes easier with reduced maximum pore diameter.

The maximum pore diameter value can be determined using the following formula by calculating the bubble point in accordance with the bubble point method (JIS K3832) using isopropanol.

$$d = 4\gamma_{IPA} \cos\theta_1 / P_a$$

(In the formula, d is the maximum pore diameter, $\gamma_{IPA}$ is the surface tension of isopropanol, $\theta_1$ is the angle of contact of the porous membranes 20 and isopropanol (cos $\theta_1$=1 when the porous membranes 20 are wetted with IPA), and $P_B$ is the bubble point value.)

Moisture permeability deteriorates when the pore diameter of the porous membranes 20 becomes too small. Therefore, the mean pore diameter of the porous membranes 20 is, for example, 0.05 μm or greater, preferably 0.1 μm or greater, and more preferably 0.2 μm or greater.

The mean pore diameter is a value determined based on the pore distribution (capacity distribution with respect to the pore diameter). In other words, the pore distribution is measured on the assumption that all the pores of the porous membranes 20 have a cylindrical shape, and the pore diameter corresponding to an intermediate value of the pore capacity is determined as the mean pore diameter. In the present invention, the mean pore diameter was determined using a Coulter Porometer manufactured by Coulter Electronics, Ltd.

The void content of the porous membranes 20 can be suitably set in accordance with the pore diameter. The void content is, for example, 40% or greater (preferably 50% or greater). The void content is also, for example, about 98% or less (preferably 90% or less).

The void content of the porous membranes 20 can be calculated based on the following formula using the bulk density D (D=W/V, where the unit of measurement is g/cm$^3$) and the density $D_{standard}$ (2.2 g/cm$^3$ for a PTFE resin) of a membrane devoid of any cavities. The densities are determined by calculating the mass W of the porous membranes 20 and the apparent volume V that includes cavities. The thickness during during calculation of volume V depends on the mean thickness measured with a dial thickness gauge (measured using "SM-1201" manufactured by Teclock Corporation when the only load applied is the main body spring load).

$$\text{Void content of the porous membrane}(\%) = [1 - (D/D_{standard})] \times 100$$

The thickness of porous membranes 20 is not particularly limited and is, for example, 200 μm or less, preferably 50 μm or less, and more preferably 40 μm or less. The moisture transmission rate of the composite membrane 10 deteriorates when the porous membranes 20 are too thick. Furthermore, the heat exchange capacity and separation efficiency decrease when the composite membranes 10 are used as heat exchange membranes or pervaporation membranes. However, ease of processing is adversely affected when the porous membranes 20 are too thin. Therefore, it is recommended that the thickness of the porous membranes 20 be, for example, 1 μm or greater, preferably 3 μm or greater, and more preferably 5 μm or greater.

Various materials can be used for the porous membranes 20. Examples include polyolefins such as polyethylene, polypropylene, and the like; polycarbonate; polystyrene; polyvinyl chloride; polyvinylidene chloride; polyester; and fluororesins such as polytetrafluoroethylene, tetrafluoroethylene/hexafluoropropylene copolymers, polyvinyl fluoride, polyvinylidene fluoride, and the like.

The preferred porous membranes 20 are fluororesin porous membranes. Fluororesins have excellent heat resistance and corrosion resistance. Particularly preferred porous membranes 20 are porous membranes made of expanded polytetrafluoroethylene (PTFE) (hereinafter occasionally referred to as "ePTFE membrane" or "drawn porous PTFE membrane"). Extremely fine pores can be formed in an ePTFE membrane, and the surface smoothness can be increased. Therefore, the moisture-permeable resin layer 30 can easily be formed uniformly and thinly.

An ePTFE membrane can be obtained by a method in which a paste obtained by mixing a PTFE fine powder with a molding auxiliary is molded, the molding auxiliary is removed from the resulting molded article, the article is drawn at a high temperature and high speed, and the drawn article is baked as needed. Any process and product known in the art to prepare ePTFE membranes may be used, for example, materials and processes such as those described in U.S. Pat. Nos. 3,953,566, 4,902,423, 4,985,296, 5,476,589, 5,814,405, or 7,306,729. The materials disclosed in Japanese Examined Patent Publication No. S51-18991 are also exemplary. The drawing may be uniaxial or biaxial. A uniaxially drawn porous PTFE is microscopically characterized in that thin island-shaped nodes (folding crystals) are present approximately orthogonal to the drawing direction, and accordion-shaped fibrils (bundles of linear molecules in which the folding crystals are melted and extracted by drawing) linking these nodes are oriented in the drawing direction. On the other hand, a biaxially drawn porous PTFE is microscopically characterized by having a cobweb-shaped fiber structure wherein the fibrils spread radially, and the nodes linking the fibrils are scattered in an island shape to form numerous spaces partitioned into fibrils and nodes. A biaxially drawn porous PTFE can be made wider more easily than a uniaxially drawn porous PTFE, has a better balance of physical properties in the longitudinal and transverse directions, and costs less to produce per unit surface area. A biaxially drawn PTFE is therefore particularly preferred.

(iv) Gas-Permeable Reinforcing Element 40

The gas-permeable reinforcing element 40 is usually formed from a fibrous resin. A reinforcing element 40 having both strength and air permeability can be produced in a simple manner by using a fibrous resin. The gas-permeable reinforcing element 40 formed by a fibrous resin may be any of a woven fabric, a knitted fabric, a nonwoven fabric (nonwoven fabric formed by a manufacturing method such as, for example, the thermal bond method or the spun-bond method), or a net A particularly preferred gas-permeable reinforcing element 40 is a nonwoven fabric.

(v) Use

The composite membrane 10 of the present invention has excellent gas barrier properties and high moisture permeability. The membrane can therefore be appropriately used as a separation membrane to selectively transmit water contained in a gas or liquid (a separation membrane for a moisture adjustment module). Examples of such applications include a dehumidification membrane, a moistening membrane, a pervaporation membrane (for example, a membrane for separating water and other liquids (ethanol or another alcohol or the like)), and the like.

In the moisture adjustment module, channels are controlled so that a water-supplying fluid (including a dehydrated fluid) is fed to one surface of the composite membrane 10, a water-receiving fluid (including a dehydrating fluid) is fed to the other surface of the composite membrane 10, and the water-supplying fluid and water-receiving fluid do not mix with each other. The preferred moisture adjustment module is a module composed of stacked flat membranes, and the water-supplying fluid and water-receiving fluid flow as countercurrents.

The air permeability of the composite membrane 10 is, for example, 5,000 seconds or greater, preferably 8,000 seconds or greater, and more preferably 99,999 seconds or greater using a standard Gurley test. Composite membranes are considered air impermeable within this application if they have a Gurley greater than 5000 s. Furthermore, the moisture permeability of the composite membrane 10 (JIS L1099, Method A-1) can, for example, be 40 $g/m^2/h$ or greater, preferably 50 $g/m^2/h$ or greater, and more preferably 60 $g/m^2/h$ or greater. In addition, the upper limit of moisture permeability is not particularly limited and may, for example, be 150 $g/m^2/h$ or less (particularly 100 $g/m^2/h$ or less).

Figure 2:
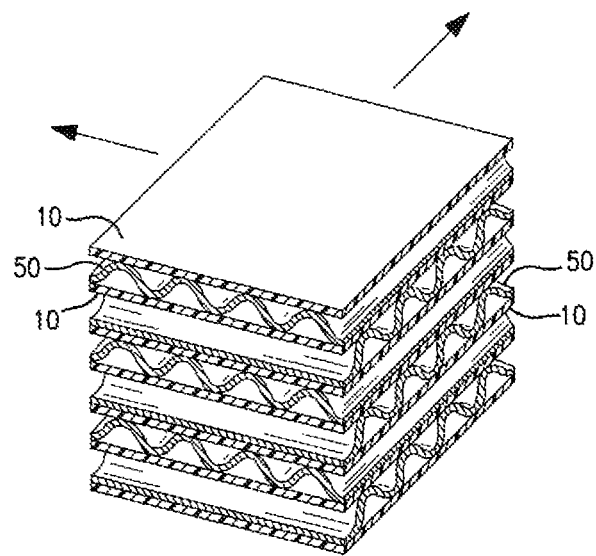
FIG. 2 is a schematic perspective cross-sectional view showing an example of a moisture adjustment module.
Figure 3:
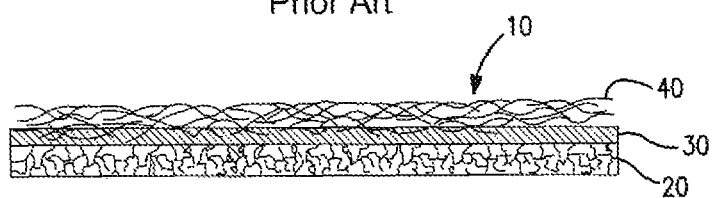
FIG. 3 is a schematic cross-sectional view showing another example of the conventional composite membrane.

Such composite membranes 10 are superposed with each other in the moisture adjustment module, and these superposed composite membranes 10 are spaced apart at predetermined intervals by spacers 50 or the like (for example, cf. FIG. 2). Forming gaps on both sides of the composite membranes allows the gaps to be used as fluid channels, and moisture to be adjusted by exchanging moisture between the fluids on both sides.

Furthermore, the gas barrier properties and moisture permeability of the composite membrane 10 of the present invention can be improved even under conditions of high temperature and high humidity by using a water-resistant moisture-permeable resin as the moisture-permeable resin. Therefore, the composite membrane can also be used as a separation membrane for selectively transmitting water vapor from a hot and humid gas (for example, as a moistening membrane for using the water vapor included in the effluent gas (especially effluent gas on the side of an air electrode) of a fuel cell electrode in the humidification of the gas fed to a fuel electrode or the air electrode (especially the fuel electrode)).

The following are, for example, the gas barrier properties and moisture permeability of a composite membrane 10 provided with improved characteristics under conditions of high temperature and high humidity. In other words, the air permeability of the composite membrane 10, after the membrane was introduced into an autoclave and allowed to stand for 32 hours in an environment having a temperature of 120° C. and a water vapor pressure of 0.23 MPa (2.3 $kgf/cm^2$), may, for example, be 50,000 seconds or greater, preferably 80,000 seconds or greater, and more preferably 99,999 seconds or greater. The moisture permeability of the composite membrane 10 under conditions of high temperature and high humidity (60° C., wet method, holding time: 5 minutes) is, for example, 200,000 $g/m^2/24$ hr or greater, and preferably 250,000 $g/m^2/24$ hr or greater. The upper limit of moisture permeability under conditions of high temperature and high humidity is not particularly limited and may, for example, be 400,000 $g/m^2/24$ hr or less (particularly 350,000 $g/m^2/24$ hr or less).

EXAMPLES

The present invention will be described in greater detail below with reference to the following examples. It is apparent, however, that the present invention is not limited to these examples and that appropriate modifications can be made within a scope applicable to the outlines given elsewhere in the document; all these modifications fall within the technical scope of the present invention.

Liquid moisture-permeable resins A and B below were used in the present examples and comparison examples.

Liquid Moisture-permeable Resin A

An aqueous solution containing the following components 1) to 4) was prepared in the following concentrations.

1) Polyvinyl Alcohol (PVA217 (product name) manufactured by Kuraray Co., Ltd.): 3% by weight 2) Aromatic Phosphate Flame Retardant as a Phosphate Flame Retardant (HF-77 (product name) manufactured by Nicca Chemical Co., Ltd.): 3% by weight 3) Guanidine Phosphate Flame Retardant (P207-S (product name) manufactured by Niece Chemical Co., Ltd.): 10% by weight 4) Blocked isocyanate as a cross-linking agent ("Meikanate MMF" (product name) manufactured by Meisel Chemical Works, Ltd.): 3.5% by weight Liquid Moisture-permeable Resin B A mixture of the following components 1) to 2) was prepared. The ratio (former/latter) of the NCO groups in the polyurethane resin and the OH groups in the ethylene glycol was 1.2/1 (mole ratio).

1) Polyurethane Resin ("Hipol 2000" (product name) manufactured by the Dow Chemical Company)

2) Ethylene Glycol

Water resistance

The water resistance of a moisture-permeable resin layer was evaluated as described below.

A liquid moisture-permeable resin was applied to a glass substrate and processed under suitable conditions depending on the resin, and a film was obtained. In the case of liquid moisture-permeable resin A, the solution was applied (amount applied: 100 $g/m^2$) and heated at a temperature of 180° C. for one minute. In the case of liquid moisture-permeable resin B, the solution was applied (amount applied: 100 $g/m^2$), dried at a temperature of 100° C. for 5 minutes, and treated with moist heat for 60 minutes at a temperature of 100° C. and a relative humidity of 80% RH.

The resulting membrane (test substrate) was placed in an autoclave, allowed to stand for 24 hours in an environment having a temperature of 120° C. and a water vapor pressure of 0.23 MPa (2.3 kgf/cm$^2$), and subsequently immersed for 15 minutes in water having a temperature of 25° C. The degree of swelling was then calculated based on the following formula.

Degree of swelling=Volume of resin after water resistance test/Volume of resin before water resistance test The results were as follows.

Liquid moisture-permeable resin A: The degree of swelling was 8 times.

Liquid moisture-permeable resin B: It was impossible to measure the degree of swelling. Most of the moisture-permeable resin was eluted in water, and the shape of the membrane was unable to be maintained.

Example 1

A composite membrane was obtained by a method in which liquid moisture-permeable resin A was applied (amount applied: 100 g/m$^2$) to one side of an ePTFE membrane (manufactured by Japan Gore-Tex Co., Inc.; mean thickness: 20 μm, mean pore diameter: 0.2 μm, maximum pore diameter: 0.4 μm, and void content of the porous membrane: 85%), an ePTFE membrane (manufactured by Japan Gore-Tex Co., Inc., mean thickness: 20 μm, mean pore diameter: 0.2 μm, maximum pore diameter: 0.4 μm, void content of the porous membrane: 85%) was layered on the coated side, and the membrane was heated for 3 minutes at a temperature of 150° C.

Furthermore, a thermal-bond nonwoven fabric (9820F (product name) manufactured by Shinwa Corp.) obtained using a polyester fiber ("Melty" (product name), 2.2 dtex, manufactured by Unitika Fibers, Ltd.) was heat-bonded to one surface (top surface, exposed surface) of an ePTFE membrane to form a composite membrane with nonwoven fabric.

The composite membrane with nonwoven fabric obtained in Example 1 was cut and the structure of the sectional layer was confirmed with a scanning electron microscope (SEM). The mean thickness of the moisture-permeable resin layer was 3 μm. Furthermore, a portion of the moisture-permeable resin layer was embedded in the ePTFE membrane.

An examination was performed to determine the room-temperature air permeability (using an Oken-type Gurley meter) and room-temperature moisture permeability (method A-1 of JIS L1099) of the composite membrane with nonwoven fabric obtained in Example 1. The air permeability (Gurley number) was 99,999 seconds or greater, and the moisture permeability was 76 g/m$^2$/h. The composite membrane with nonwoven fabric according to Example 1 had highly balanced moisture permeability and gas barrier properties.

The resistance characteristics exhibited in a hot and humid environment by the composite membrane with nonwoven fabric obtained in Example 1 were examined as follows. The composite membrane with nonwoven fabric was placed in an autoclave and allowed to stand for 24 hours in an environment having a temperature of 120° C. and a water vapor pressure of 0.23 MPa (2.3 kgf/cm$^2$). The membrane was then placed in an autoclave and allowed to stand for 32 hours in an environment having a temperature of 120° C. and a water vapor pressure of 0.23 MPa (2.3 kgf/cm$^2$). These conditions were equal to test conditions in which the membrane was exposed to water vapor for 1,000 hours at temperature of 70° C. The room-temperature air permeability of the membrane was examined after the membrane had been allowed to stand in the conditions described above. As a result, the air permeability (Gurley number) was 99,999 seconds or greater (for both wet and dry) and did not decrease at all. The condition of the composite membrane with nonwoven fabric was visually inspected and no abnormalities were noted.

The moisture permeability exhibited in a hot and humid environment (based on method A-1 of JIS L1099, except that the measurement temperature was 60° C. and the holding time was 5 minutes) by the composite membrane nonwoven fabric obtained in Example 1 was examined. The moisture permeability was a high value of 308,540 g/m$^2$/24 hr.

The surface durability of the composite membrane with nonwoven fabric obtained in Example 1 was examined as follows. A length of 100 mm or greater of adhesive tape having a width of 50 mm or greater ("Neocraft Tape" (product name) manufactured by Lintec Corporation) was attached to both sides of the composite membrane with nonwoven fabric. Subsequently, the adhesive tape that had been attached was peeled off at a speed of 200 mm/min or less, surface properties were confirmed by visual inspection, and air permeability was examined (using an Oken-type Gurley meter). No defects in the surface of the composite membrane with nonwoven fabric could be detected by visual inspection after the tape had been removed. Furthermore, the air permeability (Gurley number) was 99,999 seconds or greater, and the composite membrane with nonwoven fabric of Example 1 showed excellent surface durability.

Example 2

An ePTFE membrane (manufactured by Japan Gore-Tex Co., Inc., mean thickness: 20 μm, mean pore diameter: 0.2 μm, maximum pore diameter: 0.4 μm, void content of the porous membrane: 85%) was impregnated on one side with an ion-exchange fluororesin ("Flemion" (product name) manufactured by Asahi Glass Co., Inc.; solids content: 17%; ethanol solvent) and dried, whereby the reinforced moisture-permeable resin layer 35 shown in FIG. 8A was obtained. The reinforced moisture-permeable resin layer was sandwiched on both sides by two ePTFE membranes (manufactured by Japan Gore-Tex Co., Inc, mean thickness: 20 μm, mean pore diameter: 0.2 μm, maximum pore diameter: 0.4 μm, void content of the porous membrane of 85%) and heated at a temperature of 160° C. for three minutes while a load of 500 kPa was applied to obtain a composite membrane.

Furthermore, thermal-bond nonwoven fabric (9820F (product name) manufactured by Shinwa Corp.) obtained using a polyester fiber ("Melty" (product name), 2.2 dtex, manufactured by Unifika Fibers, Ltd.) was fusion-bonded to the surface (top surface, exposed surface) of the ePTFE membrane to form a composite membrane with nonwoven fabric.

The composite membrane with nonwoven fabric obtained in Example 2 was cut and the structure of the sectional layer was confirmed with a scanning electron microscope (SEM). The mean thickness of the moisture-permeable resin layer was 5 μm.

An examination was conducted to determine the room-temperature air permeability (using an Oken-type Gurley meter) and room-temperature moisture permeability (method A-1 of JIS L1099) of the composite membrane with nonwoven fabric obtained in Example 2. The air permeability (Gurley number) was 99,999 seconds or greater, and the moisture permeability was 120 g/m$^2$/h.

The resistance characteristics exhibited in a hot and humid environment by the composite membrane with nonwoven fabric obtained in Example 2 were examined in the same manner as in Example 1. The air permeability (Gurley number) was 99,999 seconds or greater (for both wet and dry), and did not decrease at all. The condition of the composite membrane nonwoven fabric was visually inspected and no abnormalities were noted.

Comparison Example 1

A thermal-bond nonwoven fabric (9820F (product name) manufactured by Shinwa Corp.) obtained using a polyester fiber ("Melty" (product name), manufactured by Unitika Fibers, Ltd., the physical properties were the same as those previously described) was fusion-bonded to one side of an ePTFE membrane (manufactured by Japan Gore-Tex Co., Inc., mean thickness: 20 μm, mean pore diameter: 0.2 μm, maximum pore diameter: 0.4 μm, void content of the porous membrane: 85%). Liquid moisture-permeable resin A was applied (amount applied: 230 g/m$^2$) from the nonwoven fabric side and then heated for 3 minutes at temperature of 150° C. to obtain the composite membrane.

The composite membrane obtained in comparison example 1 was cut and the structure of the sectional layer was confirmed with a scanning electron microscope (SEM). The moisture-permeable resin layer was thicker at the interface between the nonwoven fabric and the ePTFE membrane and was thin elsewhere, resulting in a moisture-permeable resin layer having a non-uniform thickness.

The resistance characteristics exhibited in a hot and humid environment by the composite membrane of comparison example 1 were examined in the same manner as in Example 1. The air permeability of the composite membrane according to comparison example 1 (Gurley number) was 23,600 seconds, the moisture permeability was 35.7 g/m$^2$/h, and both the gas barrier properties and the moisture permeability were inadequate.

Comparison Example 2

Liquid moisture-permeable resin A was applied (amount applied: 100 g/m$^2$) to one side of an ePTFE membrane (manufactured by Japan Gore-Tex Co., Inc., mean thickness: 20 μm, mean pore diameter: 0.2 μm, maximum pore diameter: 0.4 μm, void content of the porous membrane: 85%) and dried for one minute at a temperature of 180° C. A thermal-bond nonwoven fabric (9820F (product name) manufactured by Shinwa Corp.) obtained using a polyester fiber ("Melty" (product name), manufactured by Unitika Fibers, Ltd., the physical properties were the same as those previously described) was fusion-bonded to the exposed side of the ePTFE membrane to obtain a composite membrane.

The surface durability of the composite membrane of Comparison Example 2 was examined in the same manner as in Example 1. The resin layer was observed to have peeled on the side of the moisture-permeable resin layer in the composite membrane following tape removal. Furthermore, the air permeability (Gurley number) was 20 seconds and the surface durability of the composite membrane of comparison example 2 was inadequate.

Comparison Example 3

A composite membrane was obtained by applying (amount applied: 100 g/m$^2$) liquid moisture-permeable resin B to one side of the ePTFE membrane (manufactured by Japan Gore Tex Co., Inc., mean thickness: 20 μm, mean pore diameter: 0.2 μm, maximum pore diameter: 0.4 μm, void content of the porous membrane: 85%), drying the membrane for 5 minutes at a temperature of 100° C., and treating the membrane with moist heat for 60 minutes at a temperature of 100° C. and a relative humidity of 80% RH.

The resistance characteristics exhibited in a hot and humid environment by the composite membrane were examined in the same manner as in reference example 1. The air permeability (Gurley number) after testing was 99,999 seconds or greater. However, the surface of the moisture-permeable resin layer was extremely sticky.

Furthermore, the moisture permeability exhibited by the composite membrane of reference example 1 in a hot and humid environment was examined in the same manner as in Example 1. The moisture permeability was 198,920 g/m$^2$/24 hr and had decreased below that of Example 1.

Examples 3

A series of examples were made to illustrate various embodiments of the invention using a fluororesin as an air-impermeable layer. In this example a perfluorosulfonic acid (PFSA) polymer solution was prepared as described in paragraph [113]-[114] of US Patent Publication US2007/0072036 A1. This solution was cast onto a polyethylene terephthalate (PET) backer film that had been treated with ethylene tetrafluoroethylene (ETFE) to improve its release characteristics. The PFSA film was subsequently dried to remove the liquids, resulting in a perfluorosulfonic acid membrane with a thickness of ~4 μm. This film was laminated to an ~15 cm×~15 cm micro-porous ePTFE membrane prepared according to the teachings of U.S. Pat. No. 5,814,405. The ePTFE membrane had d a thickness of about 25 urn, a Gurley of about 8.5, a mass per unit area of about 7.5 g/m$^2$, a longitudinal matrix tensile strength of 267 Mpa (38,725 psi), a transverse matrix tensile strength of about 282 Mpa (40,900 psi) and an aspect ratio of about 29. The lamination was accomplished at 160 C for 3 minutes using a PHI Inc. Model B-257H-3-MI-X20 hydraulic press with heated platens. A piece of 0.25" thick GR® sheet (available from W. L. Gore & Associates, Inc, Elkton, Md.) was placed between each platen and films to be laminated. In this example, no pressure was applied in the press. After the film was laminated to one sheet of ePTFE, the backer was removed, the product was turned over and laminated under the same conditions to a second sheet of ePTFE of the same composition to form the inventive air-impermeable composite membrane. The moisture vapor transport rate (MVTR) was measured using a cell and general approach similar to that described by Gibson [in "Effect of temperature on water vapor transport through polymer membrane laminates" published in *Polymer Testing*, Volume 19, Number 6, pages 673-691]. In this test, wet gas with a known fixed water concentration is passed over one side of a membrane, and dry gas with a known fixed water concentration is passed over the other side. The MVTR is measured from either the measured loss of water between the inlet and outlet of the wet side, or the gain in water between the inlet and outlet on the dry side of the cell. Water concentrations in our cell are measured using Vaisala humidity probes (Vaisala Industrial Instruments, Woburn, Mass.), and all inlet and outlet lines are heated to at or slightly above the dew point of the gases gases to prevent condensation. Humidities and flows are set using a GlobeTech Inc. fuel cell test stand as controlled by Scribner and Associates control software. Testing was performed at a cell temperature of 80° C., which was maintained by placing the cell in a circulating water bath (Polysciences, Inc., Warrington, Pa., Model 1167). Testing was performed using a wet side relative humidity (RH) of ~70% and a dry side humidity of less than 1%, (The specific measured values for wet side RH for each sample and test are shown below in Table 1). The MVTR was calculated as described by Gibson using the data from the change in water concentration on the dry side. The dry side data was used in preference to the wet side data because it had a larger signal to noise noise ratio (i.e., a larger change in the measured RH between inlet and outlet). The active sample area for our test apparatus is 3 cm×3.5 cm or 10.5 cm$^2$. In order to increase the accuracy of the tests, 3 layers of the sample were layered on top of one another in the test cell. Testing was performed for each sample with two different flow configurations, and at four different flow conditions. The flow configurations were coflow and counterflow, the former having the wet gas and dry gas passing over the membrane in the same direction, and the latter having the wet gas and dry gas passing passing over the membrane in opposite directions. The two approaches should yield the same values of and as shown in Table 1, they do within the error of the measurement. The four flow conditions used were 4 liters per minute (LPM) on both sides, 2 LPM on both sides, 4 LPM on the wet side with 2 LPM on the dry side, and finally, 4 LPM on the dry side with 2 LPM on the dry side. The results are tabulated in Table 1 with the MVTR shown for each configuration as the average obtained with the four different flow conditions. Also shown is the calculated value of one standard deviation. Surprisingly, the measured moisture vapor transport rate (MVTR) was 2.75 times greater than a typical PFSA membrane (NAFION® membrane) described below as Comparison Example 4.

Examples 4

Example 4 was prepared identically to Example 3 except that the lamination was performed at 160 degrees C. for 3 minutes under 15 tons of force. The MVTR was 1.5 times that of Comparison Example 4.

Examples 5

An inventive air-impermeable composite membrane was prepared as follows: a PFSA polymer solution was prepared as described in Paragraphs [113]-[114] of U.S. Patent Application 2007/0072036 except the reactants were adjusted during polymerization to produce a product with an equivalent weight of about 800 The solution was coated using a #20 Meyer Bar an ETFE treated PET film that was stretched tight over a glass plate. An ePTFE membrane as described in Example 3 was then stretched over the wet coating. Then, the resulting material was dried for 20-60 s with a hair drier and then heat-treated at 160 C for three minutes. The ePTFE/PFSA film was removed from the backer and stretched over a second layer of the same ePTFE membrane described in Example 1 held tight on a glass dish so the PFSA was in contact with the second layer of ePTFE. This material was heat treated in in a 160° C. air furnace for three minutes and then removed to cool. The moisture permselective composite was removed from the glass dish and tested for MVTR as described in Example 1. The results (Table 1) show The MVTR was about three times that of Comparison Example 4.

Examples 6

An inventive moisture permselective composite was prepared with particulate reinforcement in the PFSA layer as follows: a platinum/C particulate solution was prepared essentially as described in Paragraphs [118] of U.S. Patent Application No. 2007/0072036. Three grams of this solution was mixed with 20 grams of the PFSA solution used in Example 5 plus five grams of deionized water. This solution was cast using a 6 mil drawdown bar onto the ePTFE as described in Example 3 that was stretched over an ETFE coated PET backer. A second ePTFE membrane of the same composition was stretched over the wet film. The resulting composite was dried, then annealed in a 160° C. air furnace for three minutes and then removed to cool. The water permselectivity, tested as described in Example 1, showed the MVTR was about 3.4 times that of Comparison Example 4.

Examples 7

An inventive moisture permselective composite was prepared to demonstrate that alternate PFSA compositions may be used to produce high water transport rate materials. A moisture permselective composite was prepared using the same procedure as described in Example 5 except the PFSA was prepared essentially as described in Paragraph [116] of U.S. Patent Application No. 2007/0072036. The difference between this Example and Example 5 is that the PFSA was different, primarily in that in this example the equivalent weight of the PFSA was about 920 versus the 800 equivalent weight of Example 5. The water perm selectivity, tested as described in Example 1, showed the MVTR of the material of Example 7 was about 2.8 times that of Comparison Example 4.

Examples 8

A moisture permselective composite was prepared to demonstrate that the micro-porous membrane of the inventive composite may be hydrophilic. A composite was prepared using the same materials and procedures as Example 5 except the second ePTFE layer was a water-wettable ePTFE membrane obtained Japan-Gore-Tex, Inc, Okayama, Japan (product number HSMO 71010). This product is pre-treated with a thin polyvinyl alcohol (PVA) coating on the nodes and fibrils of the ePTFE in order to render it hydrophilic while still maintaining a micro-porous air permeable structure. This inventive composite had an MVTR (Table 1) of about 2.9 times that of Comparison Example 4.

Examples 9

A moisture permselective composite was prepared to demonstrate that the porous membranes that constitute a pair need not be identical. A composite was prepared using the same materials and procedures as Example 5 except the second ePTFE layer was an ePTFE membrane made using the teachings of U.S. Pat. No. 3,953,566 to Gore with a mass per area of 7.0 g/m$^2$, a thickness of 20 microns, and porosity of at least 85%, and a longitudinal matrix tensile strength of about 67 MPa, and a transverse matrix tensile strength of about 76 MPa. This inventive composite had an MVTR (Table 1) of about 2.32 times that of Comparison Example 4.

Examples 10

An inventive moisture permselective composite was prepared using the same PFSA polymer as Example 5 and the same procedure as Example 6. Here, the solution concentrations were adjusted by adding water so the solids content was ~15%, and the water content was about 50%, the balance ethanol. A moisture permselective composite was then prepared as described in Example 6 using the solution and coating with a #20 Meyer bar. The water permselectivity, tested as described in Example 1, showed the MVTR was about 2.4 times that of Comparison Example 4.

Examples 11

Whereas Example 2 illustrates the inventive composite with a non-woven gas-permeable reinforcing element attached to one side, this example illustrates the inventive composite with a woven polymer attached to both sides of an inventive composite. A woven carbon filled polyvinylidene fluoride (PVDF) with a fiber diameter of ~140 μm (5.5 mils) and 17×21 picks/inch (inLighten™ window screen) was obtained obtained from W. L. Gore and Associates Elkton, Md. Two pieces of ~14 cm×14 cm pieces of this screen were placed on either side of a slightly larger piece of the inventive composite of Example 6. A piece of 0.25" thick GR® sheet (available from W. L. Gore & Associates, Inc, Elkton, Md.) was then placed between each screen and the platens of a PHI Inc. Model B-257H-3-MI-X20 hydraulic press where the platens were preheated to 160° C. 15-20 tons of force was applied for 3 minutes, the heaters were turned off and the part was allowed to cool to room temperature under pressure. The resulting inventive composite had the woven gas-permeable reinforcing element firmly attached to both sides of the composite.

Examples 12

A composite was prepared using the same procedure as Example 10, except a #9 Meyer bar was used for casting in the first step. The resulting composite was ~20 μm thick. The air permeability of this sample was measured and found to have a Gurley of >10,000 s.

Examples 13

A composite moisture perms elective composite was prepared with a micro-porous reinforcement in the ionomeric polymer layer as follows: A micro-porous ePTFE membrane was prepared according to the teachings of Bacino, et. al. in U.S. Pat. No. 7,306,729. This material had properties similar to Example 5 in '729 with a Gurly of about 7 s and a mass area of 2.4 g/m². A membrane was prepared using this ePTFE using the following process: the PFSA described in Example 5 was coated onto an ETFE treated PET film stretched over a glass plate using a #9 Meyer bar. The ePTFE membrane was then stretched over the wet coating and allowed to infiltrate. After infiltration, it was dried for 20-60 s with a hair drier, then annealed at 160° C. for 3 minutes after removing from the backer and stretching over a glass dish. The resulting material was sandwiched between two layers of the same ePTFE used in Example 3, then stretched over the edges of an ETFE treated PET film held on a glass plate. This was subsequently annealed at 160° C. for 3 minutes. The sample was removed from the backer, where it was observed to have formed a composite where the reinforced ionomer layer was approximately 2 μm thick.

Comparison Examples 4

A NAFION® membrane about 28 μm was prepared by casting a commercial 5% solution of 1100 equivalent weight NAFION® product (available from Ion Power, Inc., New Castle, Del.) on an ETFE coated PET backer and then drying, followed by annealing at 160° C. for 3 minute. The MVTR (Table 1) is dramatically lower than the inventive materials of Examples 3-10.

TABLE 1

| Example Number | RH on Wet side (%) Co-Flow | MVTR (Coflow) in g/m2-s | Std Dev. | Relative MVTR Co-Flow (compared to Comp. Ex. 4) | RH on Wet side (%) Counter Flow | MVTR (Counter-Flow) in g/m2-s | Std Dev. | Relative MVTR Counterflow (compared to Comp. Ex. 4) |
|---|---|---|---|---|---|---|---|---|
| 3 | 71% | 2.88 | ±0.36 | 2.75 | 70% | 3.13 | ±0.41 | 2.86 |
| 4 | 70% | 1.57 | ±0.45 | 1.50 | 70% | 1.84 | ±0.14 | 1.68 |
| 5 | 70% | 3.24 | ±0.48 | 3.08 | 68% | 3.22 | ±0.45 | 2.94 |
| 6 | 70% | 3.36 | ±0.42 | 3.20 | 70% | 3.65 | ±0.56 | 3.34 |
| 7 | 71% | 2.92 | ±0.37 | 2.78 | 70% | 2.99 | ±0.35 | 2.73 |
| 8 | 71% | 3.05 | ±0.40 | 2.90 | 70% | 2.95 | ±0.38 | 2.69 |
| 9 | 72% | 2.43 | ±0.25 | 2.32 | 72% | 2.43 | ±0.25 | 2.22 |
| 10 | 70% | 2.43 | ±0.26 | 2.32 | 69% | 2.66 | ±0.35 | 2.42 |
| Comp. Ex 4 | 72% | 1.05 | ±0.18 | 1.00 | 71% | 1.10 | ±0.09 | 1.00 |

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A method of humidifying a fuel cell having a polymer electrolyte membrane, an anode, a cathode, a fuel electrode gas feed and an air electrode gas feed, said method comprising the step of providing in at least one of said fuel electrode gas feed and said air electrode gas feed a moisture adjustment module comprising a composite membrane wherein a moisture-permeable resin layer is interposed between porous membranes of expanded polytetrafluoroethylene having pores with mean pore diameter of 0.05 μm or greater and maximum pore diameter of 15 μm or less that constitute a pair and are structurally and materially identical, wherein pores of the porous membranes are not imbedded with said resin layer; and the mean thickness of the moisture-permeable resin layer is between 0.1 and 5 µm.

2. The method according to claim 1, wherein said moisture-permeable resin comprises a water-resistant, moisture-permeable resin.

3. The method according to claim 2, wherein the degree of swelling of said water-resistant, moisture-permeable resin, is 20 times or less.

4. The method according to claim 2 wherein said water-resistant, moisture-permeable resin comprises a crosslinked polyvinyl alcohol.

5. The method according to claim 2, wherein said water-resistant, moisture-permeable resin comprises an ion-exchange fluororesin.

6. The method according to claim 5, wherein said water-resistant, moisture-permeable resin comprises a perfluorosulfonic acid polymer.

7. The method according to claim 3 wherein said water-resistant, moisture-permeable resin comprises a crosslinked polyvinyl alcohol.

8. The method according to claim 1 wherein the void content of the said porous membranes is 40% or greater.

9. The method according to claim 1 wherein the mean thickness of said porous membranes is 1 to 200 µm.

10. The method according to claim 1 wherein a gas-permeable reinforcing element is layered on at least one of the porous membranes.

11. The method according to claim 1 further comprising superposing a plurality of said composite membranes with open spaces are left therebetween.

12. A fuel cell comprising a polymer electrolyte membrane, a fuel electrode, an air electrode, a fuel electrode gas feed, an air electrode gas feed, and disposed in at least one of said fuel electrode gas feed and said air electrode gas feed a moisture adjustment module comprising a composite membrane wherein a moisture-permeable resin layer is interposed between porous membranes of expanded polytetrafluoroethylene having pores with mean pore diameter of 0.05 µm or greater and maximum pore diameter of 15 µm or less that constitute a pair and are structurally and materially identical, wherein pores of the porous membranes are not imbedded with said resin layer; and the mean thickness of the moisture-permeable resin layer is between 0.1 and 5 µm.

13. A fuel cell according to claim 12 wherein at least one of said first and second micro-porous membranes is hydrophobic.

14. A fuel cell according to claim 12 wherein at least one of said first and second micro-porous membranes is hydrophilic.

15. A fuel cell according to claim 12 wherein said resin is a perfluorosulfonic acid polymer.

16. A fuel cell according to claim 12 wherein at least one of said pair of porous membranes has a reinforcing member attached to it.

17. A fuel cell according to claim 16 wherein said reinforcing member is a non-woven material.

18. A fuel cell according to claim 16 wherein said reinforcing member is a woven material.

19. A fuel cell according to claim 12 further comprising a plurality of said composite membranes in stacked relation with open spaces therebetween.

* * * * *